US008317052B2

(12) United States Patent
Palmer (10) Patent No.: US 8,317,052 B2
(45) Date of Patent: Nov. 27, 2012

(54) CONTAINER, LID AND CLIP THEREFOR (75) Inventor: Roger Keith Palmer, Auckland (NZ)

(73) Assignee: Foodcap International Limited, Auckland (NZ)

( * ) Notice: Subject to any disclaimer, the term of this patent is extended or adjusted under 35 U.S.C. 154(b) by 1201 days.

(21) Appl. No.: 11/665,579

(22) PCT Filed: Oct. 14, 2005

(86) PCT No.: PCT/NZ2005/000268
§ 371 (c)(1),
(2), (4) Date: Dec. 21, 2007

(87) PCT Pub. No.: WO2006/041321
PCT Pub. Date: Apr. 20, 2006

(65) Prior Publication Data
US 2008/0110902 A1    May 15, 2008

(30) Foreign Application Priority Data

Oct. 15, 2004    (NZ) .................................. 536011

(51) Int. Cl.
*B65D 17/36* (2006.01)
*B65D 6/28* (2006.01)
*B65D 25/06* (2006.01)
(52) U.S. Cl. ......... 220/274; 220/284; 220/615; 426/129
(58) Field of Classification Search .................. 220/324, 220/260, 274, 275, 284, 285, 210; 99/351; 426/92, 129, 106, 312, 315, 316, 418, 513, 426/910
See application file for complete search history.

(56) References Cited

U.S. PATENT DOCUMENTS

| 1,577,851 | A | | 3/1926 | Peschke |
| 2,105,941 | A | | 8/1933 | Gleason |
| 2,015,941 | A | | 1/1938 | Gleason |
| 2,137,999 | A | * | 11/1938 | Curtis ........................ 220/257.1 |
| 2,176,384 | A | | 10/1939 | Varney |
| 2,346,232 | A | | 4/1944 | Piret et al. |
| 2,507,951 | A | | 5/1950 | Barnes |
| 2,997,858 | A | | 8/1961 | Perez |
| 3,059,452 | A | | 10/1962 | Griffin |

(Continued)

FOREIGN PATENT DOCUMENTS
AU        75151/81 B     11/1985
(Continued)

OTHER PUBLICATIONS

Salmon "Survey of Supply Chain Effectiveness,"2002, Grocery Manufactures Association/Food Products Association, pp. 1-50 at <http://www.gmacbrands.com/publications/docs/SupplyChain.pdf>; Accompanied with listed publications by year on pp. 51-53 at http://www.gmabrands.com/publications.

*Primary Examiner* — Bryon Gehman
*Assistant Examiner* — Shawn Braden
(74) *Attorney, Agent, or Firm* — Birch, Stewart, Kolasch & Birch, LLP (57) ABSTRACT A container (1) for meat storage, treatment and distribution has an external rib (5) to facilitate handling and provide strength. Clips (32) are provided for attaching a lid (6) to the container, and a clip removal tool (52) which allows clips to be removed to open the container.

15 Claims, 7 Drawing Sheets

U.S. PATENT DOCUMENTS

| | | | |
|---|---|---|---|
| 3,122,748 A | 2/1964 | Beebe, Jr. | |
| 3,272,890 A | 9/1966 | O'Leary, Jr. | |
| 3,642,263 A | 2/1972 | Pine et al. | |
| 3,894,679 A | 7/1975 | Reifers et al. | |
| 3,922,358 A | 11/1975 | Follett et al. | |
| 3,951,079 A | 4/1976 | Tolleson | |
| 3,986,655 A | 10/1976 | Rynning et al. | |
| 4,488,412 A | 12/1984 | Weaver et al. | |
| 4,498,401 A | 2/1985 | Hannecke et al. | |
| 4,522,835 A | 6/1985 | Woodruff et al. | |
| 4,534,692 A | 8/1985 | Shiomi et al. | |
| 4,589,643 A * | 5/1986 | Breum | 220/4.12 |
| 4,603,771 A | 8/1986 | Felder | |
| 4,643,104 A | 2/1987 | Rasmussen | |
| 4,659,578 A | 4/1987 | Schlegel | |
| 4,736,856 A | 4/1988 | Alneng et al. | |
| 4,744,204 A | 5/1988 | Schlegel et al. | |
| 4,772,480 A | 9/1988 | Yamane et al. | |
| 4,858,138 A * | 8/1989 | Talmadge | 705/408 |
| 4,880,138 A * | 11/1989 | Pfeiffer et al. | 220/320 |
| 4,919,955 A | 4/1990 | Mitchell | |
| 4,971,507 A | 11/1990 | Weggelaar | |
| 4,994,294 A | 2/1991 | Gould | |
| 5,111,954 A * | 5/1992 | Gaudreault | 220/266 |
| 5,129,238 A | 7/1992 | Schwartz et al. | |
| 5,201,437 A | 4/1993 | Burgdorf et al. | |
| 5,222,619 A | 6/1993 | Gregory | |
| 5,305,615 A | 4/1994 | McFadden et al. | |
| 5,353,495 A | 10/1994 | Terabayashi et al. | |
| 5,368,182 A * | 11/1994 | Schutz | 220/319 |
| 5,397,000 A | 3/1995 | Holte et al. | |
| 5,481,852 A | 1/1996 | Mitchell | |
| 5,609,039 A | 3/1997 | Green et al. | |
| 5,670,195 A * | 9/1997 | Palmer | 426/129 |
| 5,704,485 A | 1/1998 | Cautereels et al. | |
| 5,878,907 A * | 3/1999 | Graf | 220/324 |
| 6,042,859 A | 3/2000 | Shaklai et al. | |
| 6,054,161 A | 4/2000 | Palmer | |
| 6,113,962 A | 9/2000 | Spencer | |
| 6,139,240 A | 10/2000 | Ando et al. | |
| 6,182,053 B1 | 1/2001 | Rauber et al. | |
| 6,194,012 B1 | 2/2001 | Palmer et al. | |
| 6,210,730 B1 | 4/2001 | Mitchell | |
| D444,690 S | 7/2001 | Bond | |
| 6,318,114 B1 | 11/2001 | Slaughter | |
| 6,430,467 B1 | 8/2002 | D'Amelio et al. | |
| 6,520,352 B2 | 2/2003 | Mondragon et al. | |
| D480,581 S | 10/2003 | Searer | |
| 6,671,578 B1 | 12/2003 | D'Amelio et al. | |
| D490,848 S | 6/2004 | Pope et al. | |
| 2002/0106432 A1 | 8/2002 | Yamagata et al. | |
| 2002/0139126 A1 | 10/2002 | Butler | |
| 2003/0003205 A1 | 1/2003 | Costello | |
| 2003/0015446 A1 | 1/2003 | Talbot | |
| 2003/0152679 A1 | 8/2003 | Garwood | |
| 2003/0170357 A1 | 9/2003 | Garwood | |
| 2004/0081731 A1 | 4/2004 | Hood | |
| 2004/0101386 A1 | 5/2004 | Robey | |

FOREIGN PATENT DOCUMENTS

| | | |
|---|---|---|
| DE | 11 479 C | 11/1980 |
| DE | 38 34 483 A1 | 4/1990 |
| DE | 3834483 A1 | 4/1990 |
| DE | 35 15 728 A1 | 10/1996 |
| DE | 197 14 079 A1 | 10/1998 |
| DE | 19714079 A1 | 10/1998 |
| DE | 197 56 551 A1 | 7/1999 |
| DE | 298 14 220 U1 | 7/1999 |
| DE | 19756551 A1 | 7/1999 |
| EP | 0001507 A1 | 4/1979 |
| EP | 0 092 816 A2 | 11/1983 |
| EP | 0092816 A2 | 11/1983 |
| EP | 0 250 911 A1 | 1/1988 |
| EP | 0 330 473 A1 | 8/1989 |
| EP | 0 384 885 A2 | 8/1990 |
| EP | 0384885 A2 | 8/1990 |
| EP | 0 391 467 A1 | 10/1990 |
| EP | 0 834 455 A1 | 4/1998 |
| FR | 2.118.881 | 8/1972 |
| FR | 2 708 910 A1 | 2/1995 |
| FR | 2708910 A1 | 2/1995 |
| FR | 2 736 894 A1 | 1/1997 |
| FR | 2736894 A1 | 1/1997 |
| GB | 371907 | 4/1932 |
| GB | 1 203 403 | 8/1970 |
| GB | 1444911 | 9/1973 |
| GB | 2154553 A | 9/1985 |
| IT | 1245758 B | 10/1994 |
| JP | 8-107616 A | 4/1996 |
| JP | 8-173024 A | 7/1996 |
| JP | 9-193936 A | 7/1997 |
| JP | 10-028563 A | 2/1998 |
| JP | 10-28563 A | 2/1998 |
| JP | 10-045257 A | 2/1998 |
| JP | 10-45257 A | 2/1998 |
| JP | 2001-248949 A | 9/2001 |
| JP | 62-166872 A | 1/2002 |
| JP | 2002/005689 A | 1/2002 |
| NL | 1013969 C | 10/2000 |
| RU | 2221972 C2 | 1/2004 |
| WO | WO-89/06208 A1 | 7/1989 |
| WO | WO-91/16237 A1 | 10/1991 |
| WO | WO-94/11269 A1 | 5/1994 |
| WO | WO-96/36233 A | 11/1996 |
| WO | WO 99/12428 A1 | 3/1999 |
| WO | WO-99/15415 A1 | 4/1999 |
| WO | WO-00/75584 A1 | 12/2000 |
| WO | WO-01/21514 A1 | 3/2001 |
| WO | WO-01/91565 A1 | 12/2001 |
| WO | WO-02/059007 A1 | 8/2002 |
| WO | WO-2006/041323 A | 4/2006 |

\* cited by examiner

CONTAINER, LID AND CLIP THEREFOR

FIELD OF THE INVENTION

This invention relates to containers for storage, treatment or transportation of perishable food products. The invention has a particular application in the storage, treatment or transportation of meat.

BACKGROUND

Containers for meat storage, treatment or transportation are described in U.S. Pat. Nos. 5,670,195 and 6,194,012. Securely affixing a lid on to containers of this type is advantageous to ensure that the container is effectively sealed, as a fluid tight seal is important to maintaining a desired atmosphere for the products within the container.

The integrity of the container seal, or at least the attachment of the lid to the container is important also for hygiene reasons and to prevent contamination of the container contents.

Containers of this type may hold significant quantities of product which can be very heavy (for example 150 kg), so it is desirable that the container can be easily and securely handled by lifting apparatus. It also follows that the container needs to have significant structural integrity.

SUMMARY OF THE INVENTION

It is an object of the present mentioned to provide an improved container for the storage, treatment or transportation of perishable food products.

In the alternative is an object of the invention to provide improved apparatus or methods for affixing or detaching a lid to or from such a container.

As another alternative, it is an object of the present invention to at least provide the public with a useful alternative.

Accordingly in one aspect the invention consists in apparatus for storage, treatment or distribution of meat comprising,
a container having a base and four side walls dependent therefrom, a mouth at a substantially opposite end of the container from the base, and
an external rib dependant from the side walls, the rib being provided remote from the base and the mouth and extending outwardly from the walls and toward the base.

Preferably the rib comprises a first flange part that extends from the walls and a second flange part that extends toward the base.

Preferably the first flange part extends substantially perpendicular to the walls, and the second flange part extends substantially parallel to the walls.

Preferably the rib is substantially continuous about the walls.

Preferably the rib includes a plurality of support webs provided between the rib and the walls.

In a second aspect the invention consists in apparatus for storage, treatment or distribution of meat comprising:
a container,
a lid for the container, and
a plurality of clips engageable with the lid and a rim of the container, whereby the clips secure the lid on the container.

Preferably the rim is provided adjacent to, or comprises a part of, a mouth of the container.

Preferably each clip is substantially unable to be removed from the apparatus without use of a tool.

Preferably a plurality of clips can be removed in a single operation using a tool.

Preferably each clip comprises a body, one end of the body having two substantially parallel legs dependent therefrom, a projection being provided on one of the legs to engage with the lid, the other end of the body having a projection to engage with the rim.

In a third aspect the invention consists in a clip removal tool for removal of a lid securing clip which secures a lid to a container, the tool comprising
a body having a handle and a clip engaging member disposed at an angle to the handle, such that location of the clip engaging member under and end of a clip and location of a base of the clip engaging member on a surface of the container allows the handle to be rotated toward the base of the container to lever the clip free from the container.

Preferably a plurality of clip engaging members are provided whereby a plurality of clubs may be disengaged from the container simultaneously using the tool.

In a further aspect the invention broadly comprises any new feature or combination of features disclosed herein.

DRAWING DESCRIPTION

One or more embodiments of the invention will be described with reference to the accompanying drawings in which.

DETAILED DESCRIPTION

Figure 1:
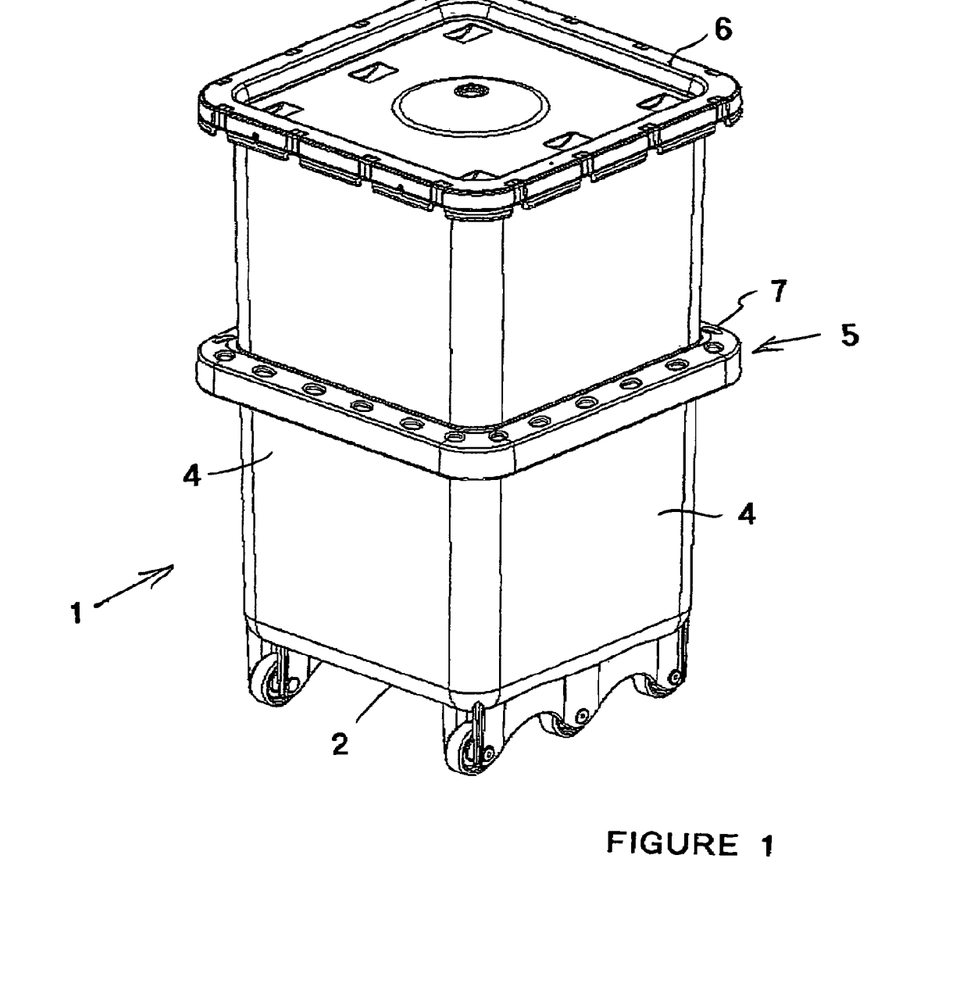
FIG. 1 is a perspective view of a container.

Referring to FIG. 1, a container for storage, treatment or transportation of a perishable product such as meat for example is shown, generally referenced 1. The container includes a base 2 and at least one sidewall, but preferably from side walls 4. The side walls preferably taper slightly outwardly from the base toward a mouth of the container (which is obscured in this view by the lid 6) to allow the container to the stacked within a like container.

A rib 5 is provided externally about the walls 4. As can be seen, the rib 5 is provided remote from both the base and the mouth of the container, and in a preferred embodiment is provided substantially midway between the base and the mouth of the container as shown in FIG. 1. The rib 5 may contain a number of apertures 7 to facilitate air movement about the container, allow rapid drainage of any liquid about the container (for example when the container is washed or sterilised), and reduce material usage and weight. We have found that Acetal has desirable properties for manufacture of the container, being sufficiently strong and robust and also preventing any movement of gases through the container walls. This material is also food safe.

Figure 2:
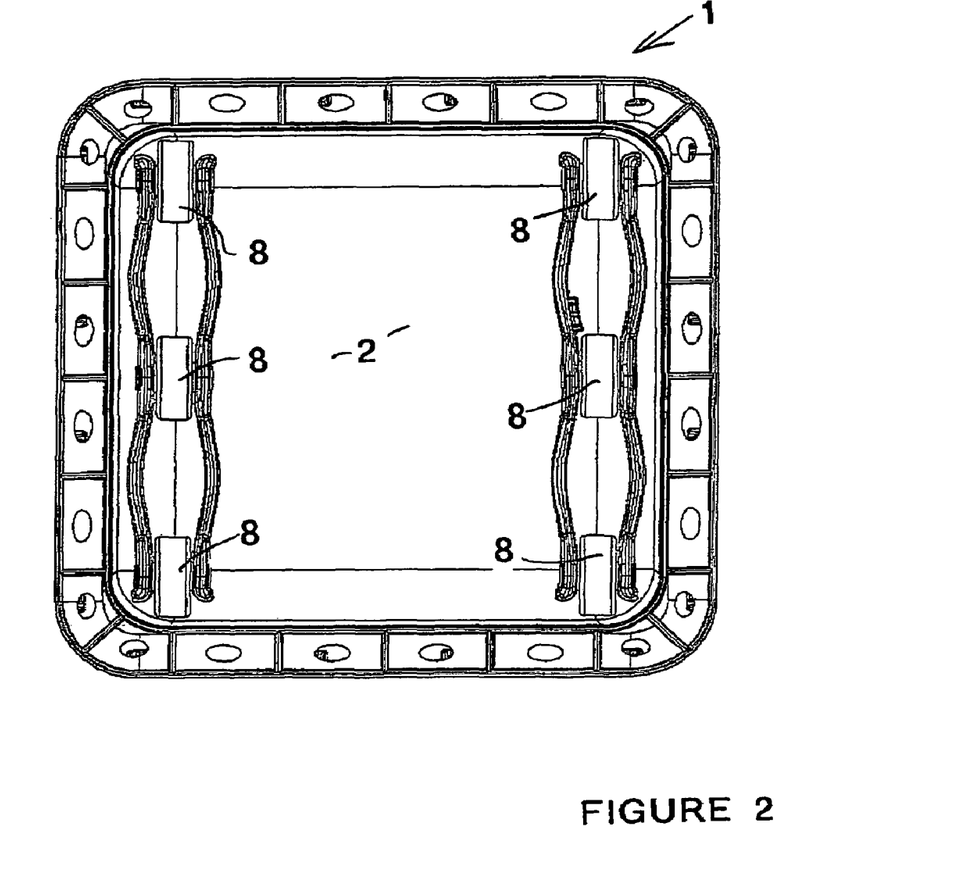
FIG. 2 is a plan view from below of the container of FIG. 1.

Turning to FIG. 2, the base of the container can be seen, having wheels 8 which allow the container to be transported across a surface such as a production facility or through an aisle of a retail store.

Figure 3:
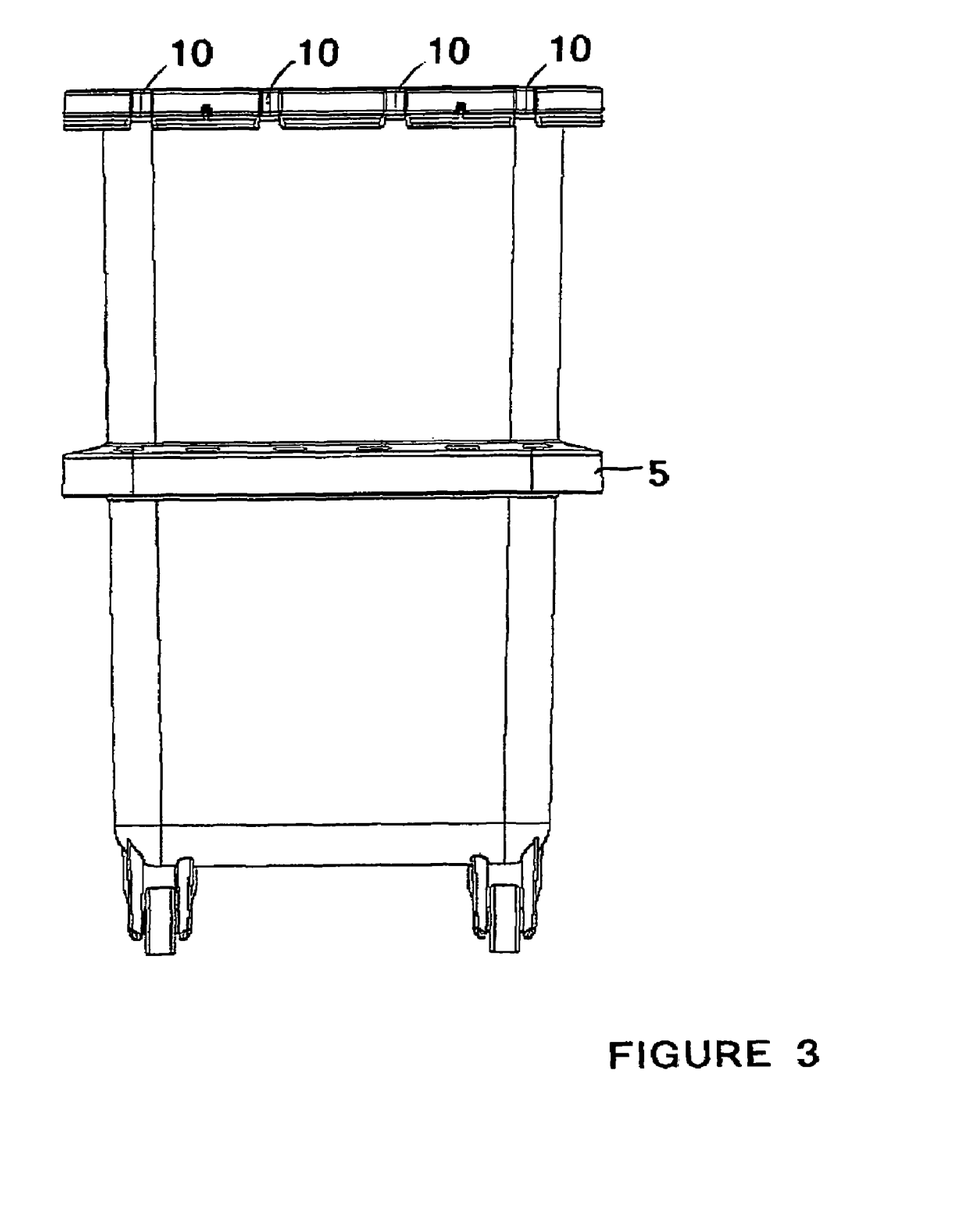
FIG. 3 is an end elevation of the container of the preceding Figures.
Figure 4:
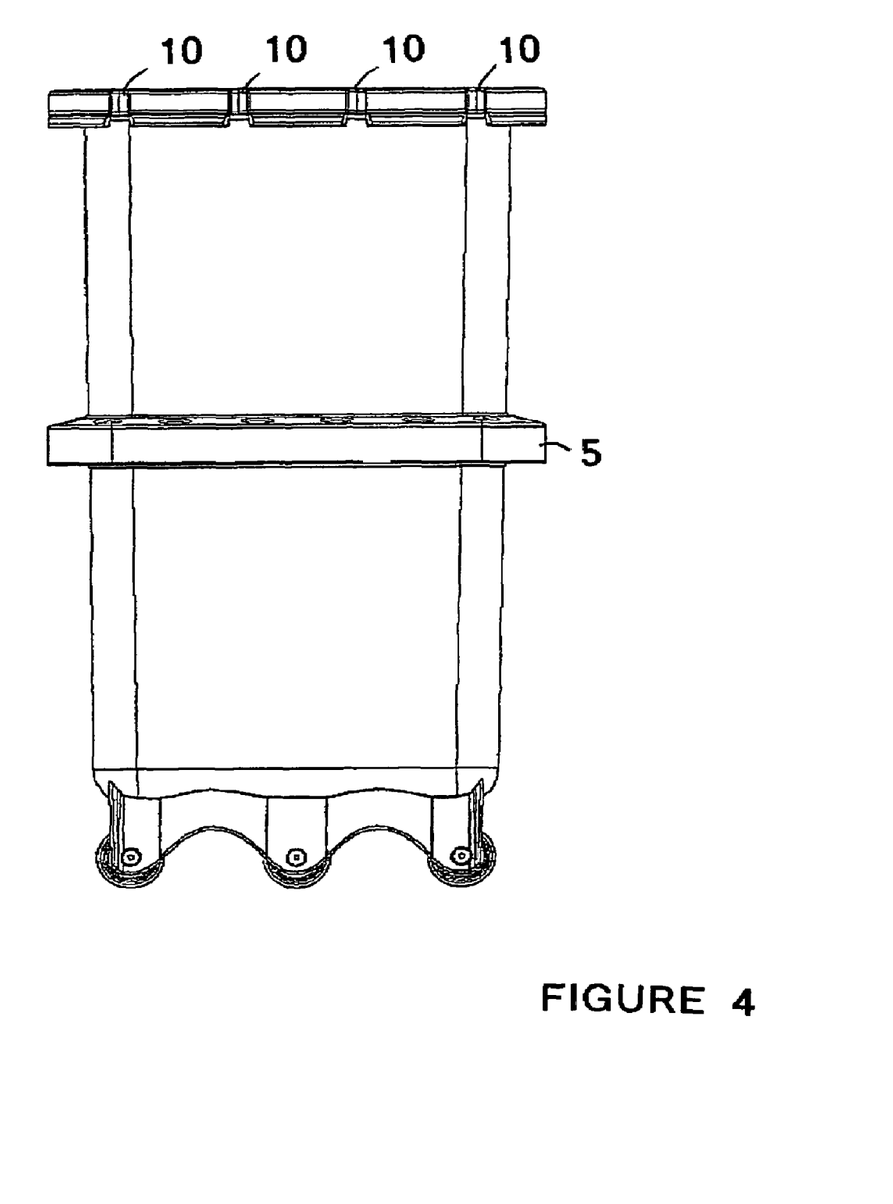
FIG. 4 is a side elevation of the container of the preceding Figures.

The container is shown in end elevation in FIG. 3 and in side elevation in FIG. 4, both views showing the rib 5. In these Figures recesses 10 in the periphery of the lid 6 are also clearly visible.

Figure 5:
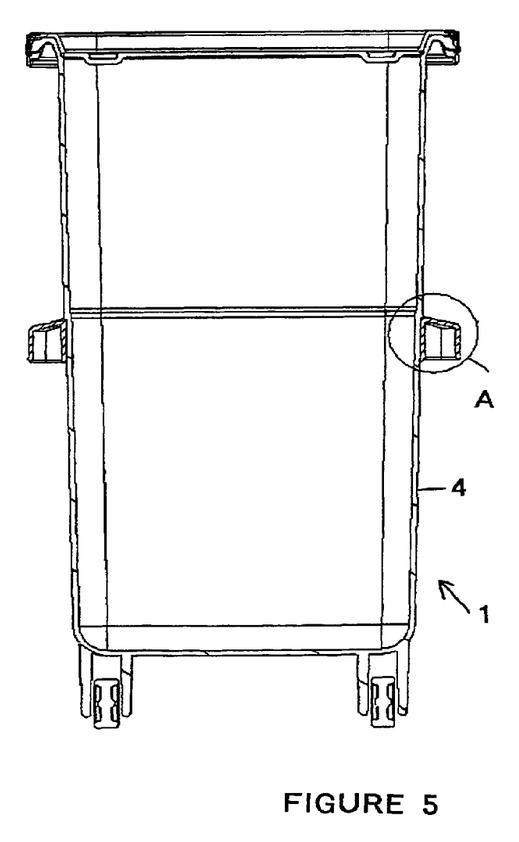
FIG. 5 is a side elevation in cross-section of the container of the preceding Figures.
Figure 6:
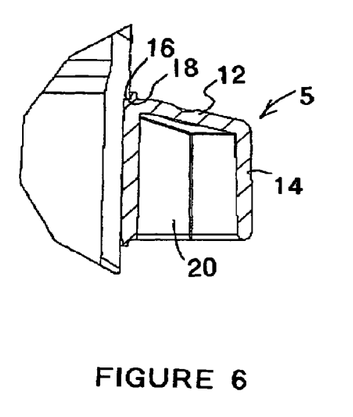
FIG. 6 is an expanded view of detail A of FIG. 5.

Turning to FIGS. 5 and 6, the rib 5 can be viewed in greater detail. As can be seen, the rib comprises a generally outwardly projecting flange portion 12 and a downwardly projecting flange portion 14. Although these portions of shown as being generally planar in the drawings, those skilled in the art will appreciate that the rib could be substantially curved. Flange portion 12 projects roughly perpendicularly outwards from the walls 4, and flange portion 12 is directed in a generally parallel direction to the walls 4. The flange 5 may be provided in a variety of different ways, but in the preferred embodiment of flange is constructed as a unitary item which is affixed to the container walls after the container walls have been formed. A shoulder 16 is preferably provided in the walls 4 and a corresponding shoulder 18 is provided on the flange. The flange can then be moved upwardly from the base of the container into abutment as shown in FIG. 6 and may be glued or welded to affix it in place.

The rib 5 provides a number of practical advantages. Firstly, it provides additional strength to the overall container structure. It also limits the extent to which one container may be nested into another container. Therefore, the containers may be easily nested and de-nested. The rib provides a space between containers when containers are provided adjacent to each other. In practice this has the advantage that air may flow between the walls of adjacent containers which is beneficial when the contents of the containers needs to be kept at a required temperature, for example when placed in a cool store or chiller. Also, the rib defines a cavity 20 within which lifting or manoeuvring apparatus (in particular automated lifting or manoeuvring apparatus) may be disposed to engage the container with a lifting or transport mechanism to thereby buy facilitate safe transportation, lifting or other movement of the container.

Figure 7:
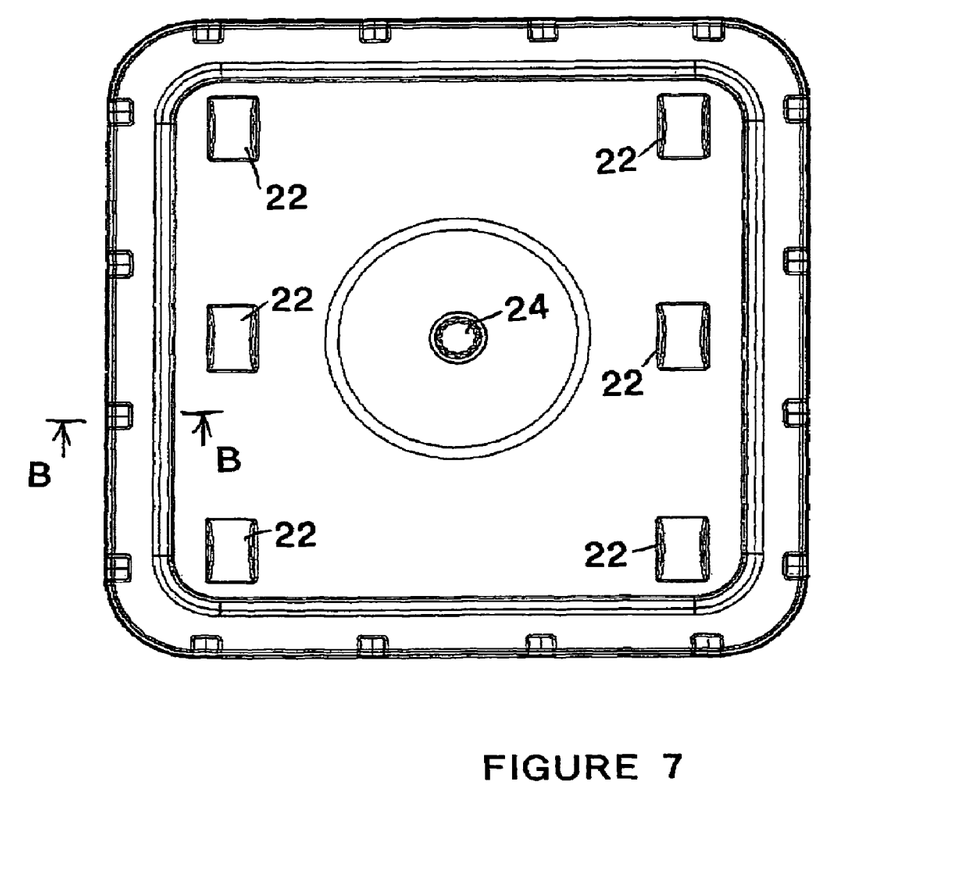
FIG. 7 is a plan view of a lid of the container of the preceding Figures.

In FIG. 7 the lid 6 is shown in plan view. As can be seen, the lid has a number of depressions 22 which are adapted to support wheels 8 of another container and thereby facilitate stacking of containers one above the other.

A valve 24 is also shown in FIG. 7. This may be used to introduce a desired atmosphere into the container, for example flush the interior of the container with a gas or mixture of gases such as carbon dioxide.

Figure 8:
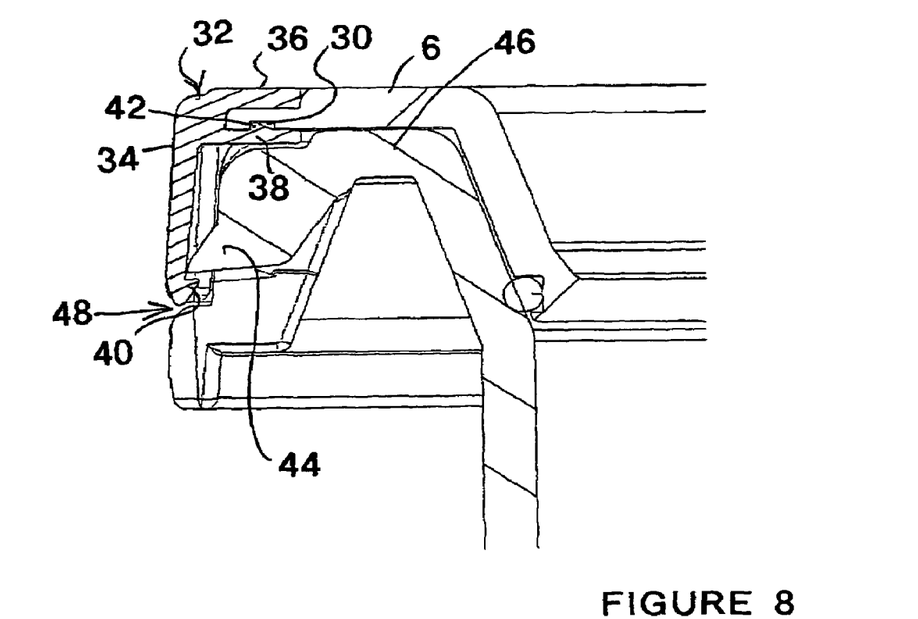
FIG. 8 is a cross-section through the lid as affixed to a mouth or rim of the container of the preceding Figures taken through line B-B of FIG. 7.

Turning to FIG. 8, a clipping mechanism is shown in cross-section. A peripheral portion of the lid 6 has a groove or recess 30. A clip 32 has a body 34 which has two legs 36 and 38 dependent from one end thereof. The other end of body 34 has a projection 40. Leg 38 has a projection 42 which extends into recess 30. Therefore, the legs 36 and 38 secure the clip to the lid 6. A rim 44 provided about the mouth 46 of the container projects so as to engage with projection 40 of the clip, preventing the clip from being moved in an upward direction to remove the lid 6 from the container.

As can be seen from the drawings, a number of clips 34 are provided. To use the clips to secure the lid to the container, the user simply engages the clips with the lid by pressing the clips onto the lid so that the legs 36 and 38 slide over the appropriate peripheral section of the lid to allow projection 42 to engage with recess 30. Then, the lid is placed over the container, causing projection 40 to slide over the projecting rim 44.

The projection 40 is located very close to the rim of the container, making it very difficult for user to insert a finger for example into the space indicated by arrow 48 to pries the clip away from the container. However, an appropriate tool may be used to disengage the clip. Such a tool is shown diagrammatically in FIG. 9. Referring to that Figure, the tool has a handle 50, dependent from which are a series of curved or angled projections 52. In practice, the tips of the projections 52 may be placed within the space indicated by arrow 48 in FIG. 8, and the tool may be then rotated on a downward direction so that regions 54 act as a fulcrum which engages with the rim of the container, thereby allowing the user to pries the clips away from the rim of the container which in turn allows the lid to be removed.

Figure 9:
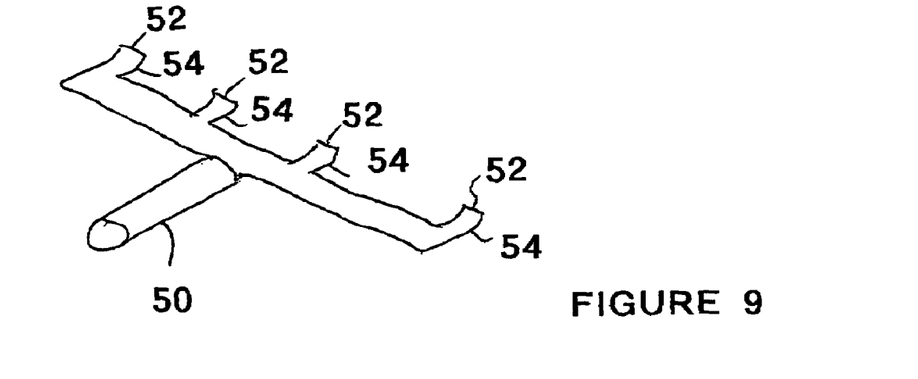
FIG. 9 is a diagrammatic perspective view of a clip disengagement tool.

Those skilled in the art to which the invention relates will see that a plurality of tools such as those shown in FIG. 9 may be arranged, one about each side of the container, in an automated fashion so that the clips can be pried away simultaneously, so that the lid can be removed in one single operation.

The lid clipping mechanism described above allows the container to be sealed in a fluid tight manner, and also provides increased structural rigidity or integrity to the container.

The invention claimed is:

1. Apparatus for storage, treatment or distribution of meat comprising:
    a container having:
        a base and four side walls dependent therefrom;
        a mouth at an opposite end of the container from the base; and
        an external rib dependent from the side walls, the external rib being continuous about the walls;
        wherein the external rib comprises a flange that extends outwardly from the walls and toward the base such that a cavity is provided between the flange and the walls and wherein the external rib is provided in a central region of the walls remote from the base and the mouth;
    a lid for the container;
    a plurality of lid securing clips which secure the lid to the container; and
    a clip removal tool for removal of the plurality of lid securing clip, the clip removal tool comprising:
        a body having a handle and a plurality of clip engaging members disposed at an angle to the handle,
        wherein location of the plurality of clip engaging members each under a respective end of the plurality of lid securing clips and location of a base of each clip engaging member on a surface of the container allow the handle to be rotated toward the base of the container to disengage the plurality of lid securing clips simultaneously from the container using the clip removal tool.

2. Apparatus as claimed in claim 1, wherein the external rib comprises a first flange part that extends from the walls and a second flange part that extends toward the base.

3. Apparatus as claimed in claim 1, wherein the first flange part extends perpendicular to the walls, and the second flange part extends parallel to the walls.

4. Apparatus as claimed in claim 1, wherein the external rib includes a plurality of support webs provided between the external rib and the walls.

5. Apparatus as claimed in claim 1, wherein the external rib is a unitary item affixed to the walls of the container.

6. Apparatus as claimed in claim 1, wherein the walls between the external rib and the base are tapered to allow the container to be nested with a like container.

7. Apparatus as claimed in claim 1, wherein
the plurality of lid securing clips engage with a rim of the container.

8. Apparatus as claimed in claim 7, wherein the rim is provided adjacent to, or comprises a part of, the mouth of the container.

9. Apparatus as claimed in claim 7, wherein each of the plurality of lid securing clips comprises a body having two ends, one end of the body having two parallel legs dependent therefrom, a projection being provided on one of the legs to engage with the lid, the other end of the body having a projection to engage with the rim.

10. Apparatus as claimed in claim 1, wherein each lid securing clip is unable to be removed from the container without use of the clip removal tool.

11. Apparatus as claimed in claim 1, wherein the plurality of lid securing clips can be removed in a single operation using the clip removal tool.

12. Apparatus as claimed in claim 1, wherein the external rib comprises a plurality of apertures arranged on the flange to facilitate air movement or liquid drainage from around the container.

13. Apparatus as claimed in claim 1 wherein each lid securing clip is integral with the lid and depends downwardly therefrom.

14. Apparatus as claimed in claim 1 wherein the external rib is a unitary item formed separately to the container and thereafter is affixed to the container.

15. Apparatus as claimed in claim 1 wherein the external rib and the defined cavity are used to engage with a manoeuvring apparatus to move the container.

* * * * *